US 11,840,259 B2

(12) United States Patent
Yu et al.

(10) Patent No.: US 11,840,259 B2
(45) Date of Patent: Dec. 12, 2023

(54) METHOD FOR SIMULATING OBSTACLE IN UNMANNED SIMULATION SCENE

(71) Applicant: APOLLO INTELLIGENT DRIVING TECHNOLOGY (BEIJING) CO., LTD., Beijing (CN)

(72) Inventors: Ning Yu, Beijing (CN); Fan Yang, Beijing (CN); Jiming Mao, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 262 days.

(21) Appl. No.: 17/119,662

(22) Filed: Dec. 11, 2020

(65) Prior Publication Data
US 2021/0354727 A1 Nov. 18, 2021

(30) Foreign Application Priority Data

May 14, 2020 (CN) .......................... 202010406966.0

(51) Int. Cl.
B60W 60/00 (2020.01)
B60W 40/02 (2006.01)
G06T 19/20 (2011.01)

(52) U.S. Cl.
CPC ........ B60W 60/0027 (2020.02); B60W 40/02 (2013.01); G06T 19/20 (2013.01);
(Continued)

(58) Field of Classification Search
CPC ............ B60W 60/0027; B60W 40/02; B60W 2554/402; B60W 2554/4041;
(Continued)

(56) References Cited

U.S. PATENT DOCUMENTS 10,831,202 B1 * 11/2020 Askeland ........ B60W 60/00276
11,195,418 B1 * 12/2021 Hong .................. G08G 1/166
(Continued)

FOREIGN PATENT DOCUMENTS

CN 107991898 A 5/2018
CN 109145489 A 1/2019
(Continued)

OTHER PUBLICATIONS

European Patent Application No. 20212486.3 extended Search and Opinion dated Jun. 1, 2021, 6 pages.
(Continued)

Primary Examiner — Geepy Pe
Assistant Examiner — Kimia Kohankhaki
(74) Attorney, Agent, or Firm — COZEN O'CONNOR

(57) ABSTRACT

A method for simulating an obstacle in an unmanned simulation scene includes: for obstacle information in a three-dimensional scene map, determining Gaussian distribution information of obstacle position detected by using a perception algorithm to be tested based on actual perception performance of the perception algorithm; adjusting each position of the simulated obstacle in the initial motion trajectory sequence, such that a position deviation between each adjusted position point in the target motion trajectory sequence and the corresponding position point in the initial motion trajectory sequence follows a Gaussian distribution; and adding the target motion trajectory sequence of the simulated obstacle to the three-dimensional scene map.

15 Claims, 5 Drawing Sheets

(52) U.S. Cl.
CPC .............. *B60W 2554/402* (2020.02); *B60W 2554/4041* (2020.02); *B60W 2554/4046* (2020.02)

(58) Field of Classification Search
CPC ........... B60W 2554/4046; G06T 19/20; G08G 1/012; G08G 1/0129; B62D 15/0265; G05B 17/02
See application file for complete search history.

(56) References Cited

U.S. PATENT DOCUMENTS

| | | | |
|---|---|---|---|
| 2016/0299507 A1 | 10/2016 | Shah et al. | |
| 2019/0086543 A1 | 3/2019 | Wang et al. | |
| 2019/0389474 A1 | 12/2019 | Yang et al. | |
| 2020/0082038 A1 | 3/2020 | Fang et al. | |
| 2021/0094540 A1* | 4/2021 | Bagschik ............ | G06F 11/3013 |
| 2021/0166474 A1* | 6/2021 | Behar ................. | G05D 1/0088 |

FOREIGN PATENT DOCUMENTS

| | | |
|---|---|---|
| CN | 109900493 A | 6/2019 |
| CN | 111091739 A | 5/2020 |
| EP | 3633551 A1 | 4/2020 |
| JP | 2003098256 A | 4/2003 |
| JP | 2009064088 A | 3/2009 |
| WO | WO 2019167457 A1 | 9/2019 |

OTHER PUBLICATIONS

Japanese Patent Application No. 2021-035288, Office Action dated Apr. 26, 2022, 4 pages.
Japanese Patent Application No. 2021-035288, English translation of Office Action dated Apr. 26, 2022, 4 pages.
Chinese Patent Application No. 202010406966.0, Office Action dated Mar. 8, 2023; 6 pages.
Chinese Patent Application No. 202010406966.0, English translation of Office Action dated Mar. 8, 2023, 8 pages.
Tang, L. et al. "On AGV Dynamic / Static Path Planning under the Multiple Random Obstacles" Journal of Anhui Polytechnic Univ, Feb. 15, 2020 vol 35, No. 1; 6 pages.

* cited by examiner

METHOD FOR SIMULATING OBSTACLE IN UNMANNED SIMULATION SCENE

CROSS-REFERENCE TO RELATED APPLICATION

This application claims priority to and benefits of Chinese Patent Application Serial No. 202010406966.0, filed the State Intellectual Property Office of P. R. China on May 14, 2020, the entire content of which is incorporated herein by reference.

FIELD

The present disclosure relates to a field of computer technologies, particularly to a field of unmanned driving technologies, and more particularly to a method for simulating an obstacle in an unmanned simulation scene, an electronic device, and a storage medium.

BACKGROUND

An unmanned vehicle (i.e., an autonomous vehicle) is a complex system, which needs a lot of tests before being put into a practical application safely and reliably. Although the test for an actual vehicle may achieve a good verification result in an actual driving scene, the test for the actual vehicle has extremely high cost and high risk. Therefore, it is very important to test the function and stability of the unmanned vehicle in a simulation scene.

An unmanned simulation scene may be constructed firstly in a procedure of performing a simulation test on the unmanned vehicle. However, constructing obstacle information in the unmanned simulation scene is very critical for accurately performing a subsequent simulation test on the unmanned vehicle. Presently, obstacles in the unmanned simulation scene are manually constructed in the related art.

SUMMARY

Embodiments of the present disclosure provide a method for simulating an obstacle in an unmanned simulation scene. The method includes: obtaining obstacle information to be added to a three-dimensional scene map, the obstacle information including an initial motion trajectory sequence of a simulated obstacle; determining Gaussian distribution information of obstacle position detected by using a perception algorithm to be tested based on actual perception performance of the perception algorithm, the Gaussian distribution information including a preset expectation value and a preset variance value of a Gaussian distribution; adjusting the initial motion trajectory sequence based on the Gaussian distribution to obtain a target motion trajectory sequence of the simulated obstacle, for each position point in the target motion trajectory sequence, a position deviation between the position point in the target motion trajectory sequence and a corresponding position point in the initial motion trajectory sequence following the Gaussian distribution; and adding the target motion trajectory sequence of the simulated obstacle to the three-dimensional scene map.

Embodiments of the present disclosure provide an electronic device. The electronic device includes: at least one processor and a memory. The memory is communicatively coupled to the at least one processor. The memory is configured to store instructions executed by the at least one processor. When the instructions are executed by the at least one processor, the at least one processor is caused to execute the method for simulating the obstacle in the unmanned simulation scene according to embodiments of the present disclosure.

Embodiments of the present disclosure provides a non-transitory computer readable storage medium having computer instructions stored thereon. The computer instructions are configured to cause a computer to execute the method for simulating the obstacle in the unmanned simulation scene according to embodiments of the present disclosure.

Other effects achieved by the above alternative methods will be described below with reference to detailed embodiments.

BRIEF DESCRIPTION OF THE DRAWINGS

The accompanying drawings are used for better understanding the solution and do not constitute a limitation of the present disclosure.

DETAILED DESCRIPTION

Description will be made below of exemplary embodiments of the present disclosure with reference to accompanying drawings, which include various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions of well-known functions and structures are omitted in the following description.

Presently, obstacles in an unmanned simulation scene are manually constructed in the related art. However, the unmanned simulation scene constructed in this way may not truly reflect the obstacle situation encountered by the unmanned vehicle during actual driving. For example, a perception result of real environment may not be reflected, and there is a certain randomness in the obtained obstacle position.

The present disclosure provides a method for simulating an obstacle in an unmanned simulation scene, an electronic device, and a storage medium, such that obstacle information in a three-dimensional scene map which may reflect an objective scene may be accurately constructed in combination with performance of a perception algorithm in an actual driving scene, thereby facilitating a subsequent simulation test for an unmanned vehicle based on the obstacle information in the three-dimensional scene map.

Description will be made below of a method and an apparatus for simulating an obstacle in an unmanned simulation scene, an electronic device, and a storage medium according to embodiments of the present disclosure with reference to accompanying drawings.

Figure 1:
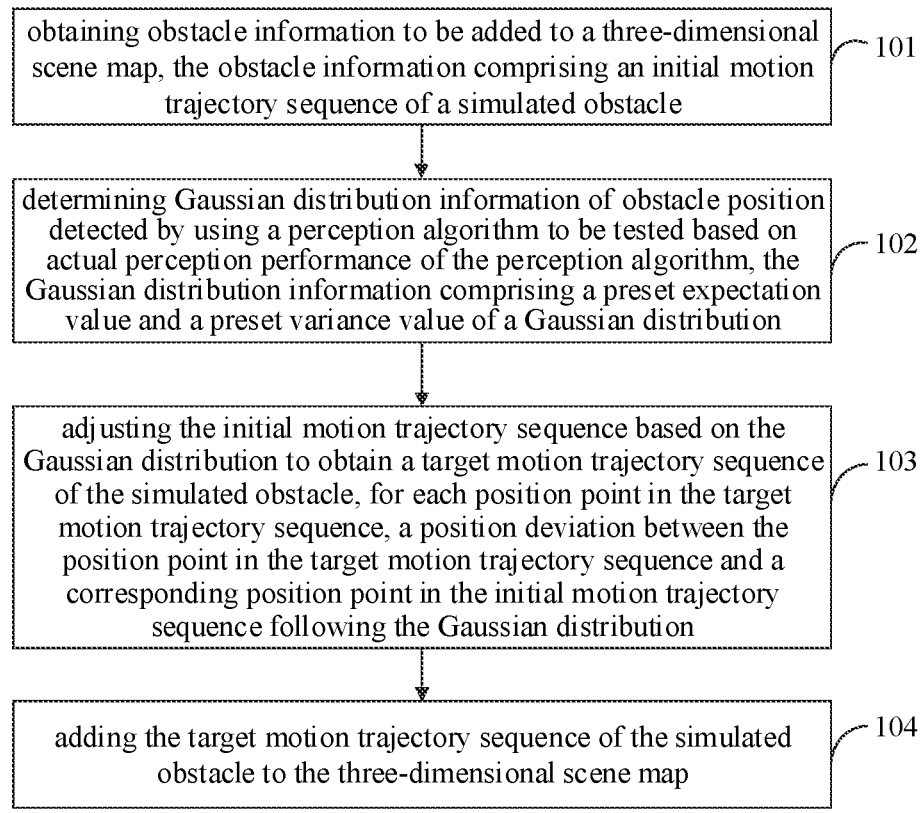
FIG. 1 is a flow chart illustrating a first embodiment of the present disclosure.

FIG. 1 is a flow chart illustrating a first embodiment of the present disclosure. It should be noted that, an execution subject of the method for simulating an obstacle in an unmanned simulation scene according to embodiments is an apparatus for simulating an obstacle in an unmanned simulation scene. The apparatus for simulating an obstacle in an unmanned simulation scene may be implemented in the form of software and/or hardware, and provided in an unmanned simulation system (referred to as a simulation system for convenience of following description). The unmanned simulation system in embodiments may be provided in an electronic device. The electronic device may be a terminal device or a server. The terminal device may include, but is not limited to, a device such as a smart phone, a tablet, and a personal computer, which is not limited in this embodiment.

As illustrated in FIG. 1, the method for simulating an obstacle in an unmanned simulation scene may include the following.

At block 101, obstacle information to be added to a three-dimensional scene map is obtained. The obstacle information includes an initial motion trajectory sequence of a simulated obstacle.

In this embodiment, the initial motion trajectory sequence of the simulated obstacle may be specified by a user in a simulation system or generated by the simulation system based on a preset rule, which is not limited herein.

The simulated obstacle in some embodiments may be a dynamic simulated obstacle.

At block 102, Gaussian distribution information of obstacle position detected by using a perception algorithm to be tested is determined based on actual perception performance of the perception algorithm. The Gaussian distribution information includes a preset expectation value and a preset variance value of a Gaussian distribution.

It may be understood that, in an actual automatic driving system, an unmanned vehicle perceives a surrounding scene through one or more sensors, and processes original data perceived by the one or more sensors with a perception algorithm to obtain a perception result. In the actual automatic driving system, the obtained perception result is not very stable generally, which manifests as the obstacle position is not exactly same in each frame. In other words, the obstacle position is randomly shaken. However, such instability may have a great impact on a decision result of an obstacle avoidance decision and a specification algorithm. Therefore, it is very important to reflect the instability of the perception result of the obstacle in the simulation scene for accurately testing the function and the performance of the unmanned vehicle. However, in the related art, the instability of the perception result of the obstacle is not reflected in the constructed unmanned simulation scene.

The sensor in the unmanned vehicle may include, but be not limited to, a sensor such as a laser radar, a millimeter wave radar, a video camera, and an ultrasonic wave.

In an embodiment of the present disclosure, in order to accurately perceive the instability of the obstacle in the unmanned vehicle scene, multiple reference obstacles are provided in an actual driving scene, and the unmanned vehicle which uses the perception algorithm is controlled to perceive position information of the reference obstacles. Correspondingly, the simulation system analyzes actual position information of the reference obstacles and the position information of the reference obstacles perceived by the unmanned vehicle using the perception algorithm. It may be determined that a position deviation between the actual position information and the perceived position information follows the Gaussian distribution based on an analysis result.

The position deviations corresponding to different perception algorithms all follow a Gaussian distribution, while different perception algorithms correspond to different Gaussian distribution parameters. That is, different perception algorithms correspond to different expectation values and different variance values of the Gaussian distributions.

In some embodiments, in order to quickly obtain the Gaussian distribution information corresponding to the perception algorithm in the simulation system, and then quickly construct the obstacle information in the unmanned simulation scene, a correspondence between the perception algorithm and the Gaussian distribution information may be preset in the simulation system.

In detail, after the perception algorithm to be tested is obtained, the Gaussian distribution information corresponding to the perception algorithm may be obtained based on the preset correspondence between the perception algorithm and the Gaussian distribution information.

At block 103, the initial motion trajectory sequence is adjusted based on the Gaussian distribution to obtain a target motion trajectory sequence of the simulated obstacle. For each position point in the target motion trajectory sequence, a position deviation between the position point in the target motion trajectory sequence and a corresponding position point in the initial motion trajectory sequence follows the Gaussian distribution.

In some embodiments, in order to enable the unmanned simulation scene to reflect the instability of the perception result of the obstacle perceived by the unmanned vehicle in the actual driving scene, and to more truly reflect an obstacle scene where obstacles are encountered by the unmanned vehicle in an actual driving procedure, the initial trajectory sequence is adjusted in combination with the Gaussian distribution to obtain the target trajectory sequence of the simulated obstacle after the initial trajectory sequence of the simulated obstacle is obtained.

At block 104, the target motion trajectory sequence of the simulated obstacle is added to the three-dimensional scene map.

With the method for simulating an obstacle in an unmanned simulation scene according to embodiments, when the obstacle information in the three-dimensional scene map is constructed, the Gaussian distribution information of the obstacle position detected by using the perception algorithm is determined based on the actual perception performance of the perception algorithm to be tested. Each position point in the initial motion trajectory sequence of the simulated obstacle is adjusted, such that the position deviation between each adjusted position point in the target motion trajectory sequence and the corresponding position point in the initial motion trajectory sequence follows the Gaussian distribution. The target motion trajectory sequence of the simulated obstacle is added to the three-dimensional scene map. In this way, the obstacle information in the three-dimensional scene map which may reflect the objective scene may be accurately constructed in combination with the performance of the perception algorithm in the actual driving scene, and it is convenient for performing the subsequent simulation test for the unmanned vehicle based on the obstacle information in the three-dimensional scene map.

In the actual automatic driving system, not only the obstacle position but also a contour of the obstacle appears shaking in the perception result. However, the contour of the simulated obstacle in the unmanned simulation scene constructed in the related art usually keeps unchanged. In order to more truly reflect the obstacle scene encountered by the unmanned vehicle in the actual driving procedure, the shaking of the contour of the obstacle in the unmanned simulation scene is simulated in embodiments of the present disclosure. Description will be made below with reference to FIG. 2.

Figure 2:
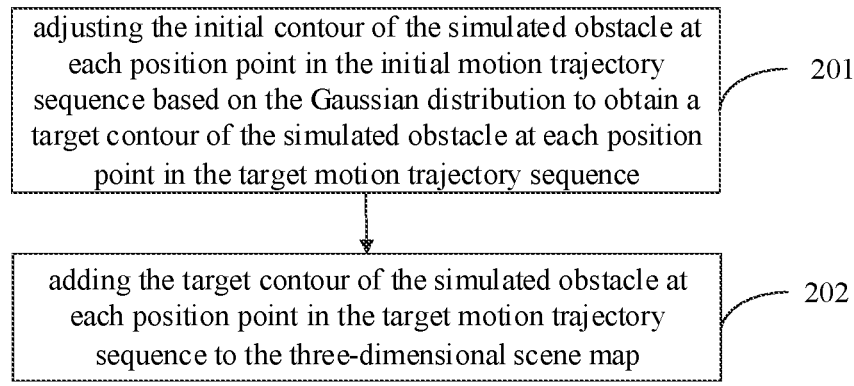
FIG. 2 is a flow chart illustrating a second embodiment of the present disclosure.

FIG. 2 is a flow chart illustrating a second embodiment of the present disclosure. This embodiment is a further refinement and extension of the above embodiment.

In embodiments of the present disclosure, the obstacle information also includes an initial contour of the simulated obstacle at each position point in the initial motion trajectory sequence.

As illustrated in FIG. 2, the method for simulating an obstacle in an unmanned simulation scene may include the following.

At block 201, the initial contour of the simulated obstacle at each position point in the initial motion trajectory sequence is adjusted based on the Gaussian distribution to obtain a target contour of the simulated obstacle at each position point in the target motion trajectory sequence.

For each position point in the target motion trajectory sequence, a contour deviation between a target contour of the simulated obstacle at the position point in the target motion trajectory sequence and an initial contour of the simulated obstacle at a corresponding position point in the initial motion trajectory sequence follows the Gaussian distribution.

At block 202, the target contour of the simulated obstacle at each position point in the target motion trajectory sequence is added to the three-dimensional scene map.

In this embodiment, the Gaussian distribution information of the obstacle position detected by using the perception algorithm is determined in combination with the actual perception performance of the perception algorithm to be tested, and the contour of the simulated obstacle is adjusted, such that the contour of the simulated obstacle in the three-dimensional scene map may more truly reflect the obstacle scene encountered by the unmanned vehicle in the actual driving procedure, and the subsequent simulation test for the unmanned vehicle is facilitated based on the obstacle information in the three-dimensional scene map.

Figure 3:
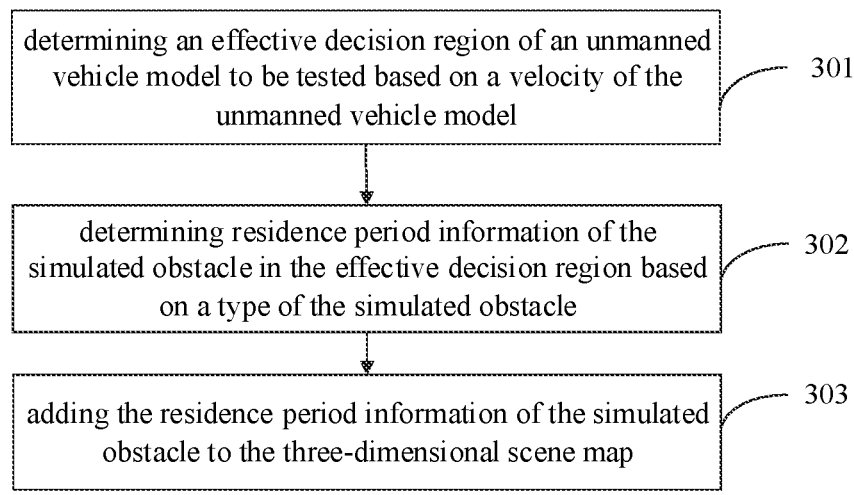
FIG. 3 is a flow chart illustrating a third embodiment of the present disclosure.

Based on the above embodiments, in some embodiments of the present disclosure, generally, a dynamic obstacle may not always stay in an effective decision region of the vehicle in the actual driving scene, but leave the effective decision region of the vehicle after staying for a period. The effective decision region of the vehicle refers to a region that has an impact on a driving planning of the vehicle. If there is an obstacle in the region, the vehicle may adjust the driving based on the obstacle. In order to more truly reflect the obstacle scene encountered by the unmanned vehicle in the actual driving procedure, as illustrated in FIG. 3, the method may also include the following.

At block 301, an effective decision region of an unmanned vehicle model to be tested is determined based on a velocity of the unmanned vehicle model.

In detail, the velocity of the unmanned vehicle model subjected to a simulation test in the three-dimensional scene map may be obtained. A position range which may influence the unmanned vehicle model is formed in a driving direction of the unmanned vehicle model based on the driving direction of the unmanned vehicle model. Further, position ranges that influence the unmanned vehicle model are determined from both sides of the unmanned vehicle model. Thus, the effective decision region of the unmanned vehicle model may be determined based on the position ranges.

At block 302, residence period information of the simulated obstacle in the effective decision region is determined based on a type of the simulated obstacle.

The type of the simulated obstacle may include a pedestrian, a motor vehicle, and the like.

In some embodiments, a statistical result of residence periods of different types of obstacles in an effective decision region of a main vehicle (i.e., the unmanned vehicle) is determined based on actual driving data. By analyzing the residence periods of different types of obstacles, it may be determined that each of the residence periods of different types of obstacles follow an exponential distribution model. Different types of obstacles correspond to different model parameters of the exponential distribution model.

For example, if the dynamic obstacle is pedestrians, the pedestrians may be divided into a conservative pedestrian and an aggressive pedestrian based on a personality difference of the pedestrians. The conservative pedestrian may generally follow the traffic rules, such as walking on any side of the road, taking an initiative to avoid a coming vehicle, and not provoking the main vehicle for no reason. The aggressive pedestrian may not generally follow the traffic rules, such as walking freely in the driveway, and may not avoid the main vehicle in time when the main vehicle comes. Even due to curiosity about the unmanned vehicle, the aggressive pedestrian may exhibit behaviors of watching and tantalizing the unmanned vehicle. Therefore, the residence period of the conservative pedestrian is different from the residence period of the aggressive pedestrian in the effective decision region of the vehicle.

In detail, after the type of the simulated obstacle is obtained, the exponential distribution model corresponding to the simulated obstacle may be obtained, and the residence period information of the type of the simulated obstacle in the effective decision region may be determined based on the exponential distribution model.

For example, in an embodiment, there are multiple simulated obstacles of the same type. Based on a corresponding exponential distribution model, the residence period of each simulated obstacle in the effective decision region may be determined, and a residence period of each of the multiple simulated obstacles follow a corresponding exponential distribution model.

At block 303, the residence period information of the simulated obstacle is added to the three-dimensional scene map.

In this embodiment, the effective decision region of the unmanned vehicle model is determined based on the velocity of the unmanned vehicle model, the residence period information of the simulated obstacle in the effective decision region is determined based on the type of the simulated obstacle, and the residence period information of the simulated obstacle in the effective decision region is added to the three-dimensional scene map. In this way, the simulated obstacle in the three-dimensional scene map may more truly reflect the obstacle scene encountered by the unmanned vehicle in the actual driving procedure, which facilitates the subsequent simulation test for the unmanned vehicle based on the obstacle information in the three-dimensional scene map.

Figure 4:
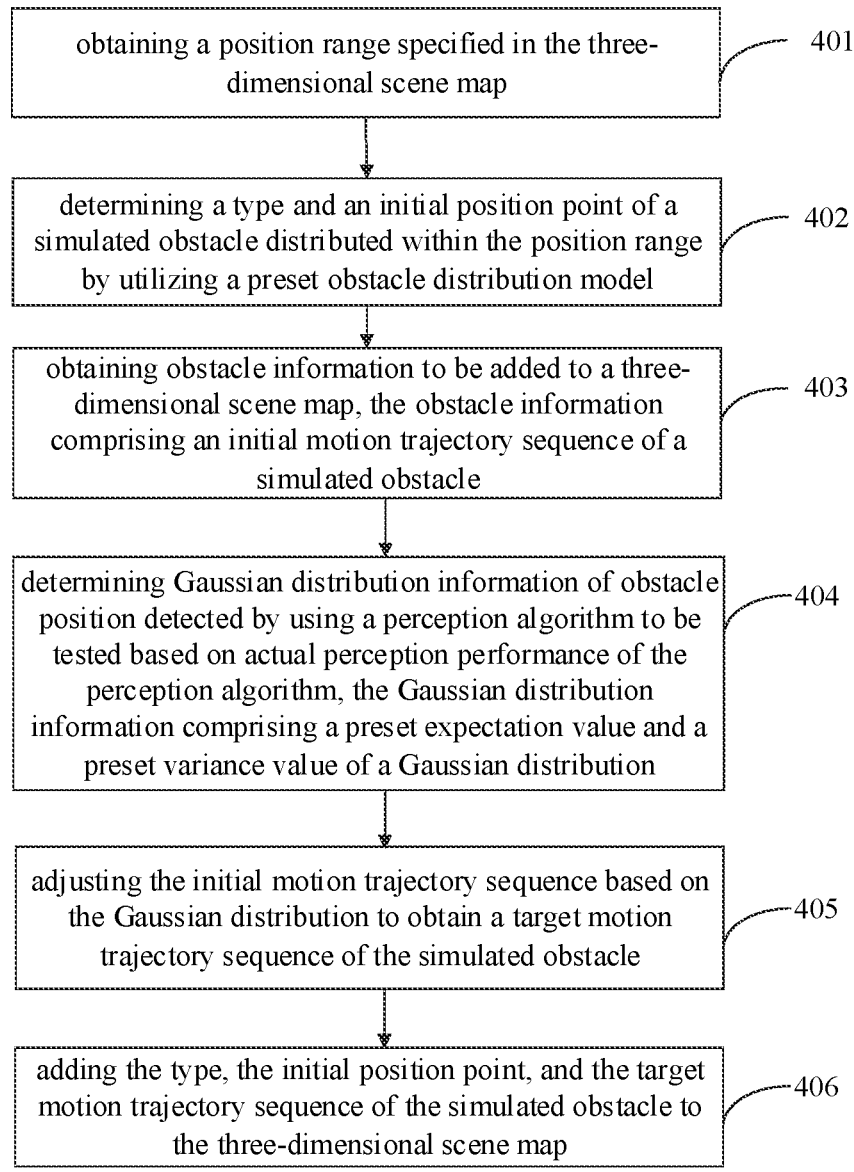
FIG. 4 is a flow chart illustrating a fourth embodiment of the present disclosure.

In the related art, in a procedure of constructing the simulation scene of the unmanned vehicle in the simulation system, obstacles distributed in a specified position range in the three-dimensional scene map and initial location points of the obstacles are set manually. However, the distribution of the obstacles set in this way may be different from distribution of obstacles within the specified position range in the actual driving scene. In order to more truly reflect the obstacle scene encountered by the unmanned vehicle in the actual driving procedure, on the basis of any of the above embodiments, as illustrated in FIG. 4, the method may also include the following.

At block 401, a position range specified in the three-dimensional scene map is obtained.

At block 402, a type and an initial position point of a simulated obstacle distributed within the position range are determined by utilizing a preset obstacle distribution model.

In detail, when the unmanned simulation scene is created by the user in the simulation system, the unmanned simulation scene may be constructed by the user within the position range specified in the three-dimensional scene map.

The obstacle information may also include the type and the initial position point of the simulated obstacle.

Correspondingly, the simulation system may determine the type and the initial position point of the simulated obstacle distributed within the position range based on the position range specified by the user and the preset obstacle distribution model.

In some embodiments, the obstacle information is extracted based on actual driving scene data, the obstacle position and type data are obtained by marking. The preset obstacle distribution model is an obstacle distribution model established based on the obstacle position and the type data. The obstacle distribution model obtains a position and an obstacle distribution feature by means of learning. In other words, the obstacle distribution model may represent a probability distribution feature between the positions and the obstacles.

At block 403, obstacle information to be added to the three-dimensional scene map is obtained. The obstacle information includes an initial motion trajectory sequence of the simulated obstacle.

At block 404, Gaussian distribution information of obstacle position detected by using a perception algorithm to be tested is determined based on actual perception performance of the perception algorithm. The Gaussian distribution information includes a preset expectation value and a preset variance value of a Gaussian distribution.

At block 405, the initial motion trajectory sequence is adjusted based on the Gaussian distribution to obtain a target motion trajectory sequence of the simulated obstacle.

For each position point in the target motion trajectory sequence, a position deviation between the position point in the target motion trajectory sequence and a corresponding position point in the initial motion trajectory sequence follows the Gaussian distribution.

At block 406, the type, the initial position point, and the target motion trajectory sequence of the simulated obstacle are added to the three-dimensional scene map.

In some embodiments, in combination with the preset obstacle distribution model, the types and the initial position points of the simulated obstacles distributed within the position range specified in the three-dimensional scene map are determined automatically, such that the distribution of the simulated obstacles within the position range specified in the three-dimensional scene map is closer to that in the actual driving scene, thus an obstacle scene in the three-dimensional scene map may more truly reflect the obstacle scene encountered by the unmanned vehicle in the actual driving procedure.

It may be understood that, after a dynamic obstacle existing in the actual driving scene encounters a vehicle, the dynamic obstacle may adjust a behavior of the dynamic obstacle based on self-perception and self-decision, or may interact with the driver of the vehicle to adjust the behavior of the dynamic obstacle. However, in the related art, active decision of the obstacle is not constructed in the unmanned simulation scene, such that there is a difference between the unmanned simulation scene and the actual driving scene. In order to construct a scene that may more truly reflect obstacles encountered by the unmanned vehicle in the actual driving procedure, the method for simulating an obstacle in the unmanned simulation scene according to an embodiment may be further described with reference to FIG. 5 below.

Figure 5:
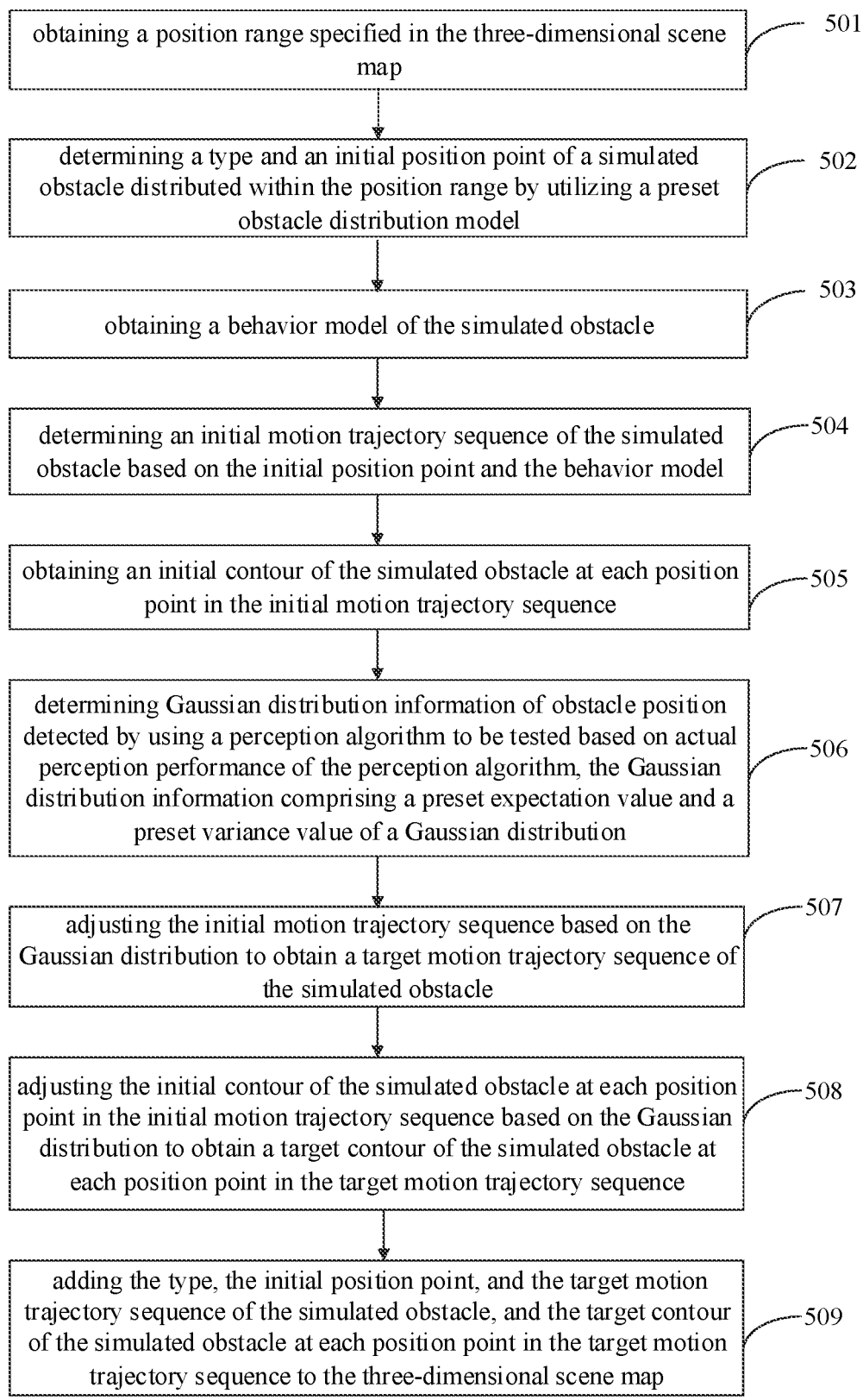
FIG. 5 is a flow chart illustrating a fifth embodiment of the present disclosure.

As illustrated in FIG. 5, the method for simulating an obstacle in an unmanned simulation scene may include the following.

At block 501, a position range specified in the three-dimensional scene map is obtained.

At block 502, a type and an initial position point of a simulated obstacle distributed within the position range are determined by utilizing a preset obstacle distribution model.

At block 503, a behavior model of the simulated obstacle is obtained.

In detail, the behavior model of the simulated obstacle may be obtained based on the type of the simulated obstacle.

The behavior model is established by analyzing behavior data in actual driving scene data made by an actual obstacle corresponding to the simulated obstacle when the actual obstacle encounters a vehicle.

At block 504, an initial motion trajectory sequence of the simulated obstacle is determined based on the initial position point and the behavior model.

In detail, after the initial position point of the simulated obstacle is obtained, the initial motion trajectory sequence of the simulated obstacle may be generated based on the type and the initial position point of the simulated obstacle.

In some embodiments, in combination with the behavior model of the simulated obstacle, the initial motion trajectory sequence of the simulated obstacle is generated, such that the generated motion trajectory sequence of the simulated obstacle may more truly reflect motion of the obstacle in the actual driving scene.

At block 505, an initial contour of the simulated obstacle at each position point in the initial motion trajectory sequence is obtained.

The simulated obstacle has a same initial contour at each position point in the initial motion trajectory sequence.

At block 506, Gaussian distribution information of an obstacle position detected by using a perception algorithm to be tested is determined based on an actual perception performance of the perception algorithm. The Gaussian distribution information includes a preset expectation value and a preset variance value of a Gaussian distribution.

At block 507, the initial motion trajectory sequence is adjusted based on the Gaussian distribution to obtain a target motion trajectory sequence of the simulated obstacle.

For each position point in the target motion trajectory sequence, a position deviation between the position point in the target motion trajectory sequence and a corresponding position point in the initial motion trajectory sequence follows the Gaussian distribution.

At block 508, the initial contour of the simulated obstacle at each position point in the initial motion trajectory sequence is adjusted based on the Gaussian distribution to obtain a target contour of the simulated obstacle at each position point in the target motion trajectory sequence.

For each position point in the target motion trajectory sequence, a contour deviation between a target contour of the simulated obstacle at the position point in the target motion trajectory sequence and an initial contour of the simulated obstacle at a corresponding position point in the initial motion trajectory sequence follows the Gaussian distribution.

It should be noted that, the action at blocks 507 and 508 may be performed without a particular order.

At block 509, the type, the initial position point, and the target motion trajectory sequence of the simulated obstacle, and the target contour of the simulated obstacle at each position point in the target motion trajectory sequence are added to the three-dimensional scene map.

In detail, after the type, and the target motion trajectory sequence of the simulated obstacle, and the target contour of the simulated obstacle at each position point in the target motion trajectory sequence are added to the three-dimensional scene map, in the subsequent test, the simulated obstacle in the three-dimensional scene map may be controlled based on the target motion trajectory sequence and the behavior model of the simulated obstacle, and the target contour of the simulated obstacle at each position point in the target motion trajectory sequence.

In embodiments, in the procedure of constructing the unmanned simulation scene, the type, the initial position, the position shaking and the residence period of the simulated obstacle in the effective decision region are determined, and the simulated obstacle in the unmanned simulation scene is constructed in combination with the above information of the simulated obstacle, such that the simulated obstacle in the constructed unmanned simulation scene may more truly reflect the obstacle scene encountered by the unmanned vehicle in the actual driving procedure.

To achieve the above embodiments, embodiments of the present disclosure also provide an apparatus for simulating an obstacle in an unmanned simulation scene.

Figure 6:
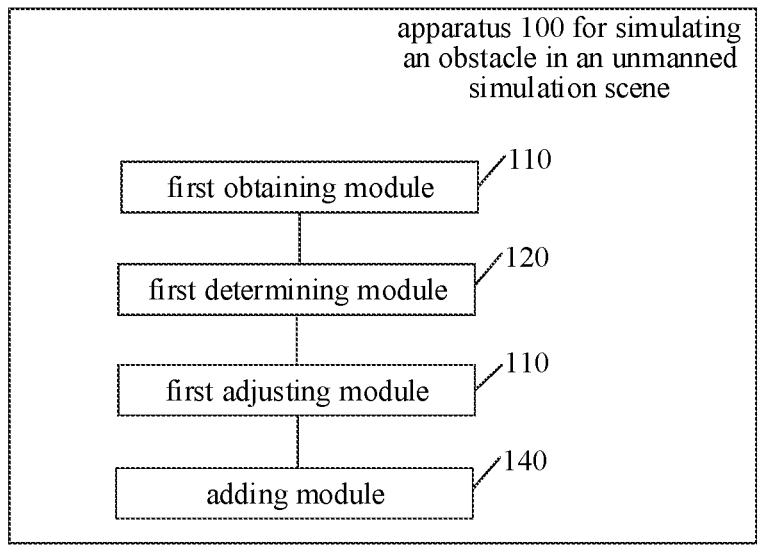
FIG. 6 is a block diagram illustrating a sixth embodiment of the present disclosure.

FIG. 6 is a block diagram illustrating a sixth embodiment of the present disclosure. As illustrated in FIG. 6, the apparatus 100 for simulating the obstacle in the unmanned simulation scene includes a first obtaining module 110, a first determining module 120, a first adjusting module 130, and an adding module 140.

The first obtaining module 110 is configured to obtain obstacle information to be added to a three-dimensional scene map. The obstacle information includes an initial motion trajectory sequence of a simulated obstacle.

The first determining module 120 is configured to determine Gaussian distribution information of obstacle position detected by using a perception algorithm to be tested based on actual perception performance of the perception algorithm. The Gaussian distribution information includes a preset expectation value and a preset variance value of a Gaussian distribution.

The first adjusting module 130 is configured to adjust the initial motion trajectory sequence based on the Gaussian distribution to obtain a target motion trajectory sequence of the simulated obstacle. For each position point in the target motion trajectory sequence, a position deviation between the position point in the target motion trajectory sequence and a corresponding position point in the initial motion trajectory sequence follows the Gaussian distribution.

The adding module 140 is configured to add the target motion trajectory sequence of the simulated obstacle to the three-dimensional scene map.

On the basis of the above embodiments, in order to more truly reflect the obstacle scene encountered by the unmanned vehicle in the actual driving procedure, in some embodiments of the present disclosure, the obstacle information also includes an initial contour of the simulated obstacle at each position point in the initial motion trajectory sequence. Based on the above embodiment, the apparatus also includes a second adjusting module (not illustrated in the accompanying drawings).

The second adjusting module is configured to adjust the initial contour of the simulated obstacle at each position point in the initial motion trajectory sequence based on the Gaussian distribution to obtain a target contour of the simulated obstacle at each position point in the target motion trajectory sequence. For each position point in the target motion trajectory sequence, a contour deviation between a target contour of the simulated obstacle at the position point in the target motion trajectory sequence and an initial contour of the simulated obstacle at a corresponding position point in the initial motion trajectory sequence follows the Gaussian distribution The adding module 140 is also configured to add the target contour of the simulated obstacle at each position point in the target motion trajectory sequence to the three-dimensional scene map.

In some embodiments, in order to more truly reflect the obstacle scene encountered by the unmanned vehicle in the actual driving procedure, the apparatus also includes a second determining module (not illustrated in the accompanying drawings) and a third determining module (not illustrated in the accompanying drawings).

The second determining module is configured to determine an effective decision region of an unmanned vehicle model to be tested based on a velocity of the unmanned vehicle model.

The third determining module is configured to determine residence period information of the simulated obstacle in the effective decision region based on a type of the simulated obstacle.

The adding module 140 is also configured to add the residence period information of the simulated obstacle to the three-dimensional scene map.

On the basis of the above embodiments, the obstacle information also includes a type and an initial position point of the simulated obstacle. The apparatus also includes: a second obtaining module (not illustrated in the accompanying drawings) and a fourth determining module (not illustrated in the accompanying drawings).

The second obtaining module is configured to obtain a position range specified in the three-dimensional scene map.

The fourth determining module is configured to determine the type and the initial position point of the simulated obstacle distributed within the position range by utilizing a preset obstacle distribution model, The adding module 140 is also configured to add the type and the initial position point of the simulated obstacle to the three-dimensional scene map.

On the basis of the above embodiments, in order to more truly reflect self-perception, independent decision and motion planning ability of an obstacle such as a pedestrian and a motor vehicle when the obstacle encounters the vehicle, in some embodiments of the present disclosure, the apparatus also includes a third obtaining module (not illustrated in the accompanying drawings) and a fifth determining module (not illustrated in the accompanying drawings).

The third obtaining module is configured to obtain a behavior model of the simulated obstacle. The behavior model is established by analyzing behavior data in actual driving scene data made by an actual obstacle corresponding to the simulated obstacle when the actual obstacle encounters a vehicle.

The fifth determining module is configured to determine the initial motion trajectory sequence of the simulated obstacle based on the initial position point and the behavior model.

It should be noted that, the above description for the method for simulating the obstacle in the unmanned simulation scene is also applicable to the apparatus for simulating the obstacle in the unmanned simulation scene in this embodiment, which is not be elaborated here.

With the apparatus for simulating the obstacle in the unmanned simulation scene according to embodiments of the present disclosure, the Gaussian distribution information of the obstacle position detected by using the perception algorithm is determined based on the actual perception performance of the perception algorithm to be tested when the obstacle information in the three-dimensional scene map is constructed. Each position point of the simulated obstacle in the initial motion trajectory sequence is adjusted, such that the position deviation between each adjusted position point in the target motion trajectory sequence and the corresponding position point in the initial motion trajectory sequence follows the Gaussian distribution. The target motion trajectory sequence of the simulated obstacle is added to the three-dimensional scene map. In this way, the obstacle information in the three-dimensional scene map which reflects the objective scene may be accurately constructed in combination with the performance of the perception algorithm in the actual driving scene, and it is convenient for performing the subsequent simulation test for the unmanned vehicle based on the obstacle information in the three-dimensional scene map.

According to embodiments of the present disclosure, the present disclosure also provides an electronic device and a readable storage medium.

Figure 7:
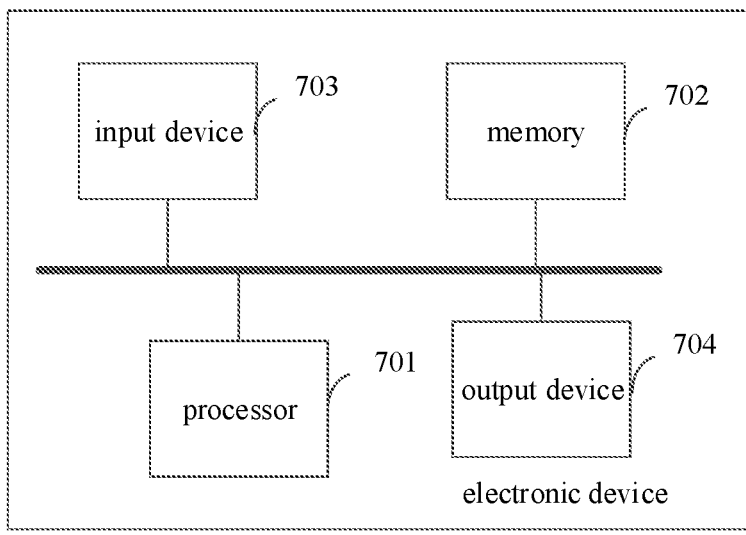
FIG. 7 is a block diagram illustrating an electronic device capable of implementing embodiments of the present disclosure.

FIG. 7 is a block diagram illustrating an electronic device capable of implementing embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the present disclosure described and/or claimed herein.

As illustrated in FIG. 7, the electronic device includes: one or more processors 701, a memory 702, and interfaces for connecting various components, including a high-speed interface and a low-speed interface. Various components are connected to each other by different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 701 is taken as an example.

The memory 702 is a non-transitory computer readable storage medium provided by the present disclosure. The memory is configured to store instructions executable by at least one processor, to enable the at least one processor to execute a method for simulating an obstacle in an unmanned simulation scene provided by the present disclosure. The non-transitory computer readable storage medium provided by the present disclosure is configured to store computer instructions. The computer instructions are configured to enable a computer to execute the method for simulating the obstacle in the unmanned simulation scene provided by the present disclosure.

As the non-transitory computer readable storage medium, the memory 702 may be configured to store non-transitory software programs, non-transitory computer executable programs and modules, such as program instructions/modules corresponding to the method for simulating the obstacle in the unmanned simulation scene according to embodiments of the present disclosure. The processor 701 is configured to execute various functional applications and data processing of the server by operating non-transitory software programs, instructions and modules stored in the memory 702, that is, implements the method for simulating the obstacle in the unmanned simulation scene according to the above method embodiment.

The memory 702 may include a storage program region and a storage data region. The storage program region may store an application required by an operating system and at least one function. The storage data region may store data created according to predicted usage of the electronic device based on the semantic representation. In addition, the memory 702 may include a high-speed random-access memory, and may also include a non-transitory memory, such as at least one disk memory device, a flash memory device, or other non-transitory solid-state memory device. In some embodiments, the memory 702 may optionally include memories remotely located to the processor 701, and these remote memories may be connected to the electronic device via a network. Examples of the above network include, but are not limited to, an Internet, an intranet, a local area network, a mobile communication network and combinations thereof.

The electronic device may also include: an input apparatus 703 and an output device 704. The processor 701, the memory 702, the input device 703, and the output device 704 may be connected via a bus or in other means. In FIG. 7, the bus is taken as an example.

The input device 703 may be configured to receive inputted digital or character information, and to generate key signal input related to user setting and function control of the electronic device, such as a touch screen, a keypad, a mouse, a track pad, a touch pad, an indicator stick, one or more mouse buttons, a trackball, a joystick and other input device. The output device 704 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine-readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for simulating an obstacle in an unmanned simulation scene, comprising:

obtaining obstacle information to be added to a three-dimensional scene map, the obstacle information comprising an initial motion trajectory sequence of a simulated obstacle;

determining Gaussian distribution information of obstacle position detected by using a perception algorithm to be tested based on actual perception performance of the perception algorithm, the Gaussian distribution information comprising a preset expectation value and a preset variance value of a Gaussian distribution;

adjusting the initial motion trajectory sequence based on the Gaussian distribution to obtain a target motion trajectory sequence of the simulated obstacle, for each position point in the target motion trajectory sequence, a position deviation between the position point in the target motion trajectory sequence and a corresponding position point in the initial motion trajectory sequence following the Gaussian distribution; and adding the target motion trajectory sequence of the simulated obstacle to the three-dimensional scene map;

wherein the method further comprises:

determining an effective decision region of an unmanned vehicle model to be tested based on a velocity of the unmanned vehicle model, wherein the effective decision region refers to a region that has an impact on a driving plan of the unmanned vehicle;

obtaining an exponential distribution model corresponding to a type of the simulated obstacle, and determining residence period information of the type of simulated obstacle in the effective decision region based on the exponential distribution model; and adding the residence period information of the type of simulated obstacle to the three-dimensional scene map.

2. The method of claim 1, wherein the obstacle information further comprises an initial contour of the simulated obstacle at each position point in the initial motion trajectory sequence, the simulated obstacle has a same initial contour at each position point in the initial motion trajectory sequence, and the method further comprises:

adjusting the initial contour of the simulated obstacle at each position point in the initial motion trajectory sequence based on the Gaussian distribution to obtain a target contour of the simulated obstacle at each position point in the target motion trajectory sequence, for each position point in the target motion trajectory sequence, a contour deviation between a target contour of the simulated obstacle at the position point in the target motion trajectory sequence and an initial contour of the simulated obstacle at a corresponding position point in the initial motion trajectory sequence following the Gaussian distribution; and adding the target contour of the simulated obstacle at each position point in the target motion trajectory sequence to the three-dimensional scene map.

3. The method of claim 1, wherein the obstacle information further comprises a type and an initial position point of the simulated obstacle, before obtaining the obstacle information to be added to the three-dimensional scene map, the method further comprises:
   obtaining a position range specified in the three-dimensional scene map;
   determining the type and the initial position point of the simulated obstacle distributed within the position range by utilizing a preset obstacle distribution model;
   adding the type and the initial position point of the simulated obstacle to the three-dimensional scene map.

4. The method of claim 2, wherein the obstacle information further comprises a type and an initial position point of the simulated obstacle, before obtaining the obstacle information to be added to the three-dimensional scene map, the method further comprises:
   obtaining a position range specified in the three-dimensional scene map;
   determining the type and the initial position point of the simulated obstacle distributed within the position range by utilizing a preset obstacle distribution model;
   adding the type and the initial position point of the simulated obstacle to the three-dimensional scene map.

5. The method of claim 3, further comprising:
   obtaining a behavior model of the simulated obstacle, the behavior model being established by analyzing behavior data in actual driving scene data made by an actual obstacle corresponding to the simulated obstacle when the actual obstacle encounters a n unmanned vehicle; and
   determining the initial motion trajectory sequence of the simulated obstacle based on the initial position point and the behavior model.

6. An electronic device, comprising:
   at least one processor; and
   a memory, communicatively coupled to the at least one processor,
   wherein the memory is configured to store instructions executable by the at least one processor, and when the instructions are executed by the at least one processor, the at least one processor is caused to implement a method for simulating an obstacle in an unmanned simulation scene, the method comprising:
   obtaining obstacle information to be added to a three-dimensional scene map, the obstacle information comprising an initial motion trajectory sequence of a simulated obstacle;
   determining Gaussian distribution information of obstacle position detected by using a perception algorithm to be tested based on actual perception performance of the perception algorithm, the Gaussian distribution information comprising a preset expectation value and a preset variance value of a Gaussian distribution;
   adjusting the initial motion trajectory sequence based on the Gaussian distribution to obtain a target motion trajectory sequence of the simulated obstacle, for each position point in the target motion trajectory sequence, a position deviation between the position point in the target motion trajectory sequence and a corresponding position point in the initial motion trajectory sequence following the Gaussian distribution; and
   adding the target motion trajectory sequence of the simulated obstacle to the three-dimensional scene map;
   wherein the method further comprises:
   determining an effective decision region of an unmanned vehicle model to be tested based on a velocity of the unmanned vehicle model, wherein the effective decision region refers to a region that has an impact on a driving plan of the unmanned vehicle;
   obtaining an exponential distribution model corresponding to a type of the simulated obstacle, and determining residence period information of the type of simulated obstacle in the effective decision region based on the exponential distribution model; and
   adding the residence period information of the type of simulated obstacle to the three-dimensional scene map.

7. The electronic device of claim 6, wherein the obstacle information further comprises an initial contour of the simulated obstacle at each position point in the initial motion trajectory sequence, the simulated obstacle has a same initial contour at each position point in the initial motion trajectory sequence, and the method further comprises:
   adjusting the initial contour of the simulated obstacle at each position point in the initial motion trajectory sequence based on the Gaussian distribution to obtain a target contour of the simulated obstacle at each position point in the target motion trajectory sequence, for each position point in the target motion trajectory sequence, a contour deviation between a target contour of the simulated obstacle at the position point in the target motion trajectory sequence and an initial contour of the simulated obstacle at a corresponding position point in the initial motion trajectory sequence following the Gaussian distribution; and
   adding the target contour of the simulated obstacle at each position point in the target motion trajectory sequence to the three-dimensional scene map.

8. The electronic device of claim 6, wherein the obstacle information further comprises a type and an initial position point of the simulated obstacle, before obtaining the obstacle information to be added to the three-dimensional scene map, the method further comprises:
   obtaining a position range specified in the three-dimensional scene map;
   determining the type and the initial position point of the simulated obstacle distributed within the position range by utilizing a preset obstacle distribution model;
   adding the type and the initial position point of the simulated obstacle to the three-dimensional scene map.

9. The electronic device of claim 7, wherein the obstacle information further comprises a type and an initial position point of the simulated obstacle, before obtaining the obstacle information to be added to the three-dimensional scene map, the method further comprises:
   obtaining a position range specified in the three-dimensional scene map;
   determining the type and the initial position point of the simulated obstacle distributed within the position range by utilizing a preset obstacle distribution model;
   adding the type and the initial position point of the simulated obstacle to the three-dimensional scene map.

10. The electronic device of claim 8, wherein the method further comprises:
    obtaining a behavior model of the simulated obstacle, the behavior model being established by analyzing behavior data in actual driving scene data made by an actual obstacle corresponding to the simulated obstacle when the actual obstacle encounters a n unmanned vehicle; and determining the initial motion trajectory sequence of the simulated obstacle based on the initial position point and the behavior model.

11. A non-transitory computer readable storage medium having computer instructions stored thereon, wherein the computer instructions are configured to cause a computer to execute a method for simulating an obstacle in an unmanned simulation scene, the method comprising:
obtaining obstacle information to be added to a three-dimensional scene map, the obstacle information comprising an initial motion trajectory sequence of a simulated obstacle;
determining Gaussian distribution information of obstacle position detected by using a perception algorithm to be tested based on actual perception performance of the perception algorithm, the Gaussian distribution information comprising a preset expectation value and a preset variance value of a Gaussian distribution;
adjusting the initial motion trajectory sequence based on the Gaussian distribution to obtain a target motion trajectory sequence of the simulated obstacle, for each position point in the target motion trajectory sequence, a position deviation between the position point in the target motion trajectory sequence and a corresponding position point in the initial motion trajectory sequence following the Gaussian distribution; and
adding the target motion trajectory sequence of the simulated obstacle to the three-dimensional scene map;
wherein the method further comprises:
determining an effective decision region of an unmanned vehicle model to be tested based on a velocity of the unmanned vehicle model, wherein the effective decision region refers to a region that has an impact on a driving plan of the unmanned vehicle;
obtaining an exponential distribution model corresponding to a type of the simulated obstacle, and determining residence period information of the type of simulated obstacle in the effective decision region based on the exponential distribution model; and
adding the residence period information of the type of simulated obstacle to the three-dimensional scene map.

12. The storage medium of claim 11, wherein the obstacle information further comprises an initial contour of the simulated obstacle at each position point in the initial motion trajectory sequence, the simulated obstacle has a same initial contour at each position point in the initial motion trajectory sequence, and the method further comprises:
adjusting the initial contour of the simulated obstacle at each position point in the initial motion trajectory sequence based on the Gaussian distribution to obtain a target contour of the simulated obstacle at each position point in the target motion trajectory sequence, for each position point in the target motion trajectory sequence, a contour deviation between a target contour of the simulated obstacle at the position point in the target motion trajectory sequence and an initial contour of the simulated obstacle at a corresponding position point in the initial motion trajectory sequence following the Gaussian distribution; and
adding the target contour of the simulated obstacle at each position point in the target motion trajectory sequence to the three-dimensional scene map.

13. The storage medium of claim 11, wherein the obstacle information further comprises a type and an initial position point of the simulated obstacle, before obtaining the obstacle information to be added to the three-dimensional scene map, the method further comprises:
obtaining a position range specified in the three-dimensional scene map;
determining the type and the initial position point of the simulated obstacle distributed within the position range by utilizing a preset obstacle distribution model;
adding the type and the initial position point of the simulated obstacle to the three-dimensional scene map.

14. The storage medium of claim 12, wherein the obstacle information further comprises a type and an initial position point of the simulated obstacle, before obtaining the obstacle information to be added to the three-dimensional scene map, the method further comprises:
obtaining a position range specified in the three-dimensional scene map;
determining the type and the initial position point of the simulated obstacle distributed within the position range by utilizing a preset obstacle distribution model;
adding the type and the initial position point of the simulated obstacle to the three-dimensional scene map.

15. The storage medium of claim 11, wherein the method further comprises:
obtaining a behavior model of the simulated obstacle, the behavior model being established by analyzing behavior data in actual driving scene data made by an actual obstacle corresponding to the simulated obstacle when the actual obstacle encounters an unmanned vehicle; and
determining the initial motion trajectory sequence of the simulated obstacle based on the initial position point and the behavior model.

* * * * *